(12) United States Patent
Ho

(10) Patent No.: US 9,071,929 B2
(45) Date of Patent: Jun. 30, 2015

(54) PORTABLE DEVICE AND ASSOCIATED POSITION METHOD

(71) Applicant: Wistron Corporation, New Taipei (TW)

(72) Inventor: Kuan-Ying Ho, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 13/939,212

(22) Filed: Jul. 11, 2013

(65) Prior Publication Data

US 2014/0120946 A1 May 1, 2014

(30) Foreign Application Priority Data

Oct. 31, 2012 (TW) .............................. 101140280 A

(51) Int. Cl.
*H04W 4/02* (2009.01)
(52) U.S. Cl.
CPC ................ *H04W 4/02* (2013.01); *H04W 4/028* (2013.01)
(58) Field of Classification Search
USPC ............... 455/456.1, 456.3; 340/539.1, 572.1
See application file for complete search history.

(56) References Cited

U.S. PATENT DOCUMENTS

2009/0278737 A1 11/2009 Chiu
2012/0178476 A1 7/2012 Ortiz et al.

FOREIGN PATENT DOCUMENTS

TW 200946943 11/2009
TW 201210383 A1 3/2012

OTHER PUBLICATIONS

TW Office Action dated Aug. 19, 2014.
Partial translation of TW Office Action dated Aug. 19, 2014.
Partial translation of TW201210383 (Published Mar. 1, 2012).

*Primary Examiner* — Sam Bhattacharya
(74) *Attorney, Agent, or Firm* — McClure, Qualey & Rodack, LLP

(57) ABSTRACT

A portable device and associated positioning method is provided. The portable device, signally connected to a tracking server, includes a transceiver, a positioning unit and a controller. The positioning method includes steps of: fetching a tracking parameter corresponding to the portable device from the tracking server when an activation condition is satisfied; generating at least one set of positioning information through a positioning system; storing the first positioning information to a positioning database; and selectively uploading contents of the positioning database to the tracking server according to the tracking parameter.

20 Claims, 6 Drawing Sheets

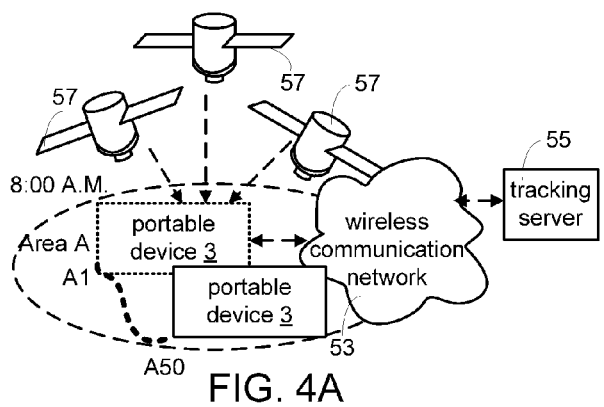
FIG. 4A
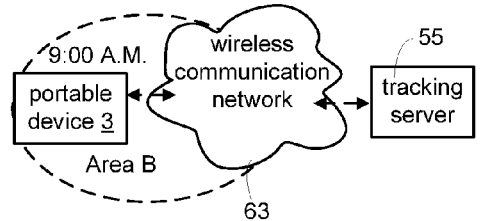
FIG. 5A
| No. | positioning information |
|---|---|
| 1st set | A1 |
| 2nd set | A2 |
| ⋮ | ⋮ |
| 50th set | A50 |
FIG. 4B
| No. | positioning information |
|---|---|
| 1st set | NA |
FIG. 4C
| No. | Positioning information |
|---|---|
| 1st set | NA |
FIG. 5B

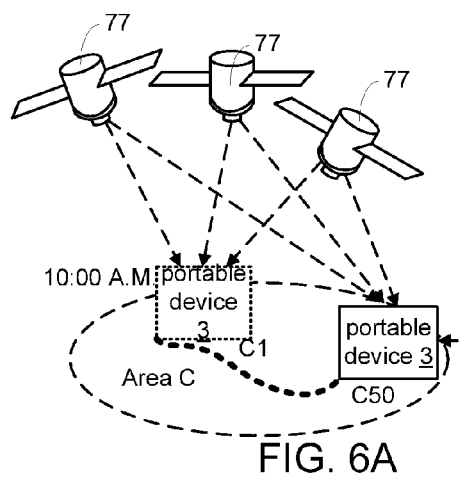
FIG. 6A
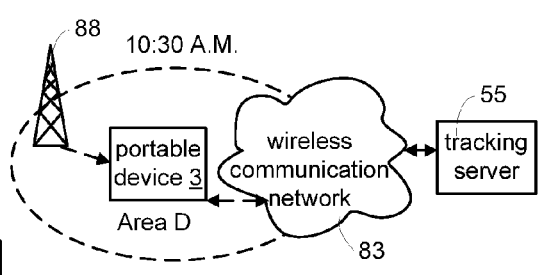
FIG. 7A
| No. | positioning information |
|---|---|
| 1st set | C1 |
| 2nd set | C2 |
| ⋮ | ⋮ |
| 50th set | C50 |
FIG. 6B
| No. | positioning information |
|---|---|
| 1st set | C1 |
| 2nd set | C2 |
| ⋮ | ⋮ |
| 50th set | C50 |
| 51st set | D1 |
FIG. 7B

PORTABLE DEVICE AND ASSOCIATED POSITION METHOD

This application claims the benefit of Taiwan application Serial No. 101140280, filed Oct. 31, 2012, the subject matter of which is incorporated herein by reference.

BACKGROUND OF THE INVENTION

1. Field of the Invention

The invention relates in general to a portable device and associated positioning method, and more particularly to a portable device that selectively uploads positioning information and associated positioning method.

2. Description of the Related Art

Many current portable devices, such as portable pads and mobile handsets, provide a positioning function through a Global Positioning System (hereinafter, GPS) carried therein.

In addition to providing positioning information to a user during normal operations of the user, a portable device equipped with the GPS positioning function is also capable of assisting the user in finding the portable device when the portable device is misplaced. Alternatively, when the portable device is utilized by a child, a parent or a teacher of the child may also learn the whereabouts of the child through the positioning function of the portable device.

FIG. 1 shows a schematic diagram of a user searching for a portable device via a tracking server.

With the prevalence of the Internet, a portable device 11 generally supports a function of a wireless communication network 13. For example, when the portable device 11 is a mobile handset, WiFi or Global System for Mobile Communications (hereinafter, GSM) may be utilized as the wireless communication network 13 for communicating with the external. When the portable device 11 is a portable tablet or a laptop computer, WiFi may be utilized as the wireless communication network 13.

When a user 16 needs to track a location of the portable device 11, based on a conventional approach, the location of the portable device 11 may be inquired through a tracking server 15 signally connected to the portable device 11.

The above conventional approach is described in detail below.

By utilizing a Short Message Service (SMS) or the Internet, a user sends a tracking instruction to the tracking server 15. The tracking server 15 then transmits the tracking instruction to the portable device 11 via the wireless communication network 13 (WiFi or GSM).

Upon receiving the notification from the tracking server 15, the portable device 11 first obtains positioning information through a positioning technology such as the GPS, and then returns the positioning information back to the tracking server 15 via the wireless communication network 13, for example.

However, such conventional technique for tracking the location of the portable device 11 is bound by certain restrictions.

First of all, the portable device 11 may not be situated in an environment having the wireless communication network 13. Or, the portable device 11 may be situated in an environment having a weak wireless communication network 13. As such, the tracking server 15 is hindered from establishing a connection with the portable device 11 via the wireless communication network 13.

Consequently, the portable device 11 does not have access to receiving the tracking instruction sent out by the tracking server 15. Further, the positioning information obtained by the portable device 11 cannot be transmitted to the tracking server 15 via the wireless communication network 13. In other words, the above tracking mechanism is largely affected by the communication status of the wireless communication network 13.

In a wireless communication network system, Media Access Control (hereinafter, MAC) addresses of all WiFi access points in the vicinity of the portable device are detected. After that, coordinates of the MAC addresses are fetched from a database and compared to obtain an actual location of the portable device.

Assuming that an obstruction is between the portable device 11 and the WiFi access points, and connection statuses between the portable device 11 and the WiFi access points are poor. In such case, positioning through WiFi is infeasible.

Secondly, the positioning function of the portable device 11 may also be restricted by the surrounding environment.

A basic principle of the GPS is that, signals are transmitted via several satellites revolving around the earth, and an actual location is calculated by cross-referencing paths of the signals. Yet, when a shelter obstructs signals coming from the sky, the GPS cannot successfully perform the positioning function.

However, a certain number of satellite signals are required for the portable device to cross-reference and cross-calculate its location. Hence, if insufficient number of the satellite signals are received, the actual location of the portable device 11 cannot be calculated.

Thus, once the GPS or the wireless network communication positioning system fails in providing the position information, the tracking mechanism of the portable device 11 also becomes invalid.

In other words, when employing the conventional approach for tracking the portable device 11, the portable device 11 can only be successfully tracked given that the portable device 11 is situated in a good network connection status with a serviceable positioning function. However, when either of the network connection status or the positioning function is unsatisfactory, the location of the portable device 11 may not be readily tracked and obtained by the above conventional approach.

SUMMARY OF THE INVENTION

According to an aspect of the present invention, a positioning method is provided. The positioning method, applied to a portable device signally connected to a tracking server, includes steps of: fetching a tracking parameter corresponding to the portable device from the tracking server when an activation condition is satisfied; generating at least one set of positioning information through a positioning system; storing the positioning information to a positioning database; and selectively uploading contents of the positioning database to the tracking server according to the tracking parameter.

According to another aspect of the present invention, a portable device is provided. The portable device, signally connected to a tracking server, includes: a transceiver, signally connected to the tracking server, for fetching a tracking parameter corresponding to the portable device from the tracking server when an activation condition is satisfied; a positioning unit, for generating at least one set of positioning information via a positioning system; a storage unit, electrically connected to the transceiver and the positioning unit, for providing a positioning database; and a controller, electrically connected to the transceiver, the positioning unit and the storage unit, for storing the first positioning data in the positioning unit, and selectively controlling the transceiver to upload contents of the positioning database to the tracking server according to the tracking parameter.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 4A is a schematic diagram of a portable device located in an area A according to FIG. 3;

FIG. 4B is a schematic diagram of contents of a positioning database when a portable device is in the condition in FIG. 4A;

FIG. 4C is a schematic diagram of contents of an emptied positioning database after uploading contents of a positioning database to a tracking server when a portable device is in a status shown in FIG. 4A;

FIG. 5A is a schematic diagram of a portable device located in an area B according to FIG. 3;

FIG. 5B a schematic diagram of contents of a database when a portable device is in the condition in FIG. 5A;

FIG. 6A is a schematic diagram of a portable device located in an area C according to FIG. 3;

FIG. 6B is a schematic diagram of contents of a positioning database when a portable device is in the condition in FIG. 6A;

FIG. 7A is a schematic diagram of a portable device located in an area D according to FIG. 3;

FIG. 7B is a schematic diagram of contents of a positioning database when a portable device is in the condition in FIG. 7A;

DETAILED DESCRIPTION OF THE INVENTION

To reinforce the management on a portable device, a portable device and a positioning method for the portable device are provided by the present invention.

As mentioned before, the issue of failing in obtaining positioning information of the portable device may be caused by a poor connection status of a wireless communication network, or unsatisfactory positioning effects. Regardless of the above issues, and provides positioning information to the tracking server in a stable and consistent approach.

Figure 1:
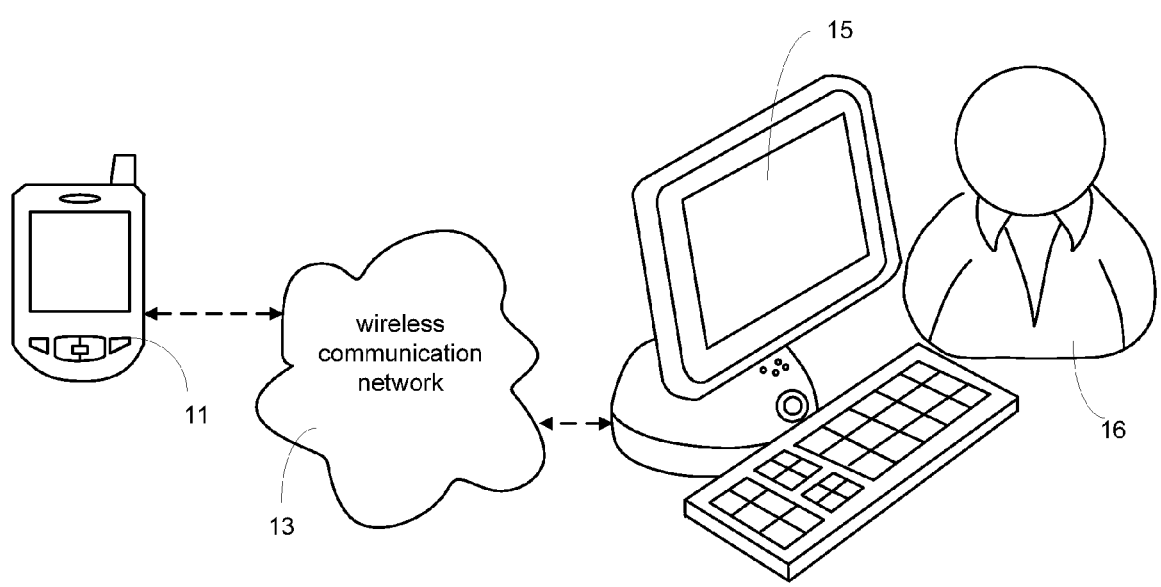
FIG. 1 (prior art) is a schematic diagram of a user searching for a portable device via a tracking server.
Figure 2:
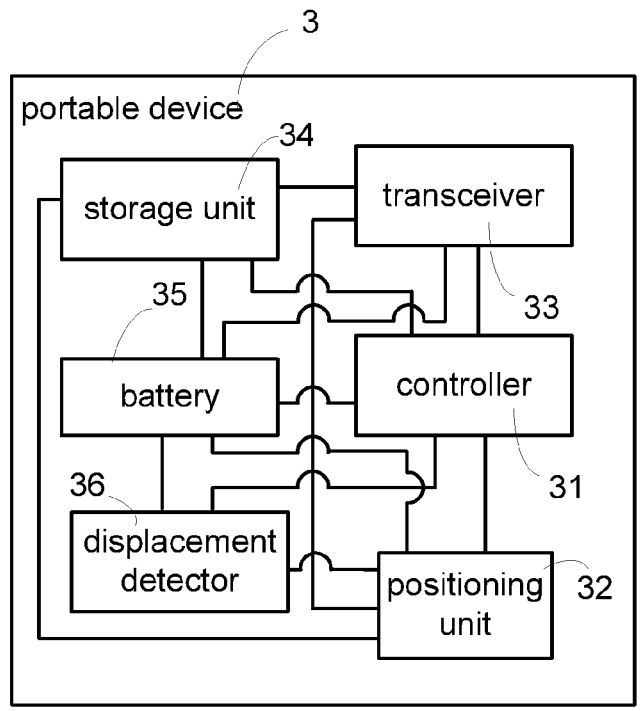
FIG. 2 is a system block diagram of a portable device according to an embodiment of the present invention.

FIG. 2 shows a system block diagram of a portable device according to an embodiment of the present invention. A portable device 3 according to an embodiment includes a transceiver 33, a positioning unit 32, a controller 31, a storage unit 34, a displacement detector 36 and a battery 35. The displacement detector 36 may be a gravity sensor (hereinafter, G-sensor) or a gyroscope.

The portable device 3 is signally connected to a tracking server via the transceiver 33. The storage unit 34 is electrically connected to the transceiver 33 and the positioning unit 32. The controller 31 is electrically connected to the transceiver 33, the positioning unit 32 and the storage unit 34. The battery 35 is electrically connected and provides electric power to the transceiver 33, the positioning unit 32, the storage unit 34, the displacement detector 36 and the controller 31.

Based on a principle of the present invention, the portable device 3 determines whether to perform positioning according to whether an activation condition is satisfied. The activation condition may be satisfied in two following cases. For instance, the activation condition is satisfied when a predetermined period is passed. Or, the activation condition is satisfied when a connection between the portable device 3 and a wireless communication network changes from a disconnected status to a connected status.

After the activation condition is satisfied, a tracking parameter corresponding to the portable device 3 is received. When the portable device 3 learns via the transceiver 33 that its corresponding tracking function is activated, the portable device 3 generates positioning information through the positioning unit 32. Associated application and operation details are further described below.

Figure 3:
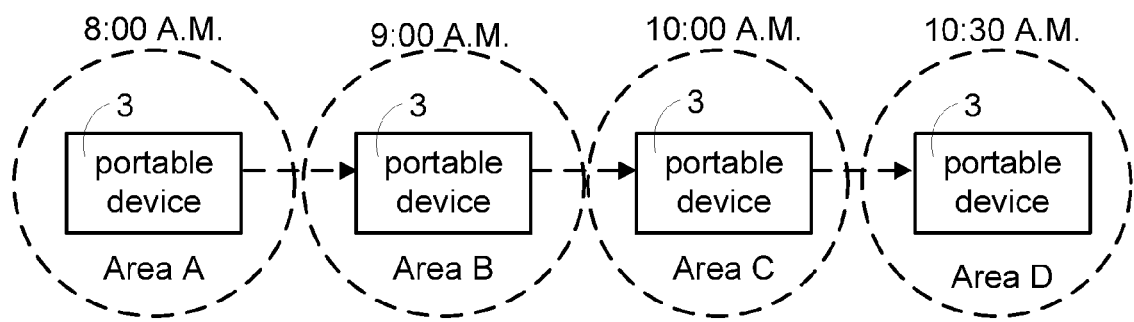
FIG. 3 is a schematic diagram of a portable device relocating from an area A to an area D according to an embodiment of the present invention.

FIG. 3 shows a schematic diagram of a portable device relocating from an area A to an area D. In FIG. 3, it is assumed that the portable device 3 is located in the area A between 8:00 a.m. to 9:00 a.m., in the area B between 9:00 a.m. to 10:00 a.m., in the area C between 10:00 a.m. to 10:30 a.m., and in the area D at 10:30 a.m.

The positioning method applied by the portable device in the areas A to D according to one embodiment shall be described below.

FIG. 4A shows a schematic diagram of the portable device located in the area A according to FIG. 3.

It is assumed that the transceiver 33 of the portable device 3 establishes a signal connection with a tracking server 55 at 8:00 a.m. via a wireless communication network 53 of the area A. At this point, the controller 31 receives a tracking parameter corresponding to the portable device 3 via the transceiver 33. Assume that the tracking parameter received from the tracking server 55 by the portable device is configured to activate the tracking function.

While the portable device 3 is located in the area A, the location of the portable device 3 may also change. For illustration purposes, assume that the positioning unit 32 obtains 50 consecutive sets of positioning information when the portable device 3 is in a moving state.

Further, it is assumed that an interval for obtaining a next set of positioning information is 5 seconds. Thus, the positioning unit 32 of the portable device 3 is activated for a period of 250 seconds to correspondingly generate 50 sets of positioning information. After 250 seconds, the positioning unit 32 is deactivated.

Therefore, during the initial 250 seconds starting from 8:00 a.m., assume that the portable device 3 moves from a location A1 to a location A50 within the area A, and the positioning unit 32 generates positioning information corresponding to the location A1, location A2, ... and location A50 via multiple satellites 57 provided by the GPS.

After the portable device obtains the 50 sets of positioning information through the positioning unit 32, the controller 31 stores the positioning information in form of a database in the storage unit 34.

The number of sets of the positioning information consecutively obtained by the positioning unit 32, and the interval for obtaining a next set of positioning information may be modified according to different applications.

FIG. 4B shows a schematic diagram of contents of the positioning database when the portable device is in the condition in FIG. 4A.

As shown in FIG. 4B, after the portable device 3 obtains the 50 sets of positioning information (corresponding to the locations A1, A2, . . . and A50) through the positioning unit 32, a duplicate of archive positioning information is stored in the positioning database according to a generation sequence of the positioning information.

The controller 31 then controls the transceiver 33 to upload the contents of the positioning database to the tracking server 55.

During the uploading process of the positioning information to the positioning database by the transceiver 33, a poor connection status of the wireless communication network 53 or other factors may occur to cause the contents of the positioning database to be incompletely uploaded to the tracking server 55. At this point, the contents of the positioning database are preserved instead of being deleted. That is, the contents of the positioning database are maintained as shown in FIG. 4B.

When positioning information needs to be uploaded in a next positioning process while the 50 sets of positioning information are still stored in the storage unit 34, the transceiver 33 transmits the 50 sets of positioning information in FIG. 4B together to the tracking server 55.

On the other hand, when the tracking server 55 successfully receives the 50 sets of positioning information provided by the positioning database, it means that a user is allowed to monitor latest statuses of the portable device 3.

At this point, the old positioning information no longer needs to be kept in the storage unit 34. The controller 31 controls the storage unit 34 to delete the contents of the positioning database, such that the contents of the positioning database are emptied as shown in FIG. 4C.

FIG. 4C shows a schematic diagram of contents of an emptied positioning database after uploading the contents of the positioning database to the tracking server when the portable device is in a condition shown in FIG. 4A.

In continuation of the above description, after the transceiver 33 successfully uploads the positioning information to the tracking server 55, the controller 31 deletes the archive positioning information in the positioning database. At this point, the first round of positioning process of the portable device 3 is complete, and no further action is taken until a situation of satisfying the activation condition takes place.

In practice, the transceiver 33 does not always successfully upload all of the 50 sets of positioning information. For example, the transceiver 33 may upload only 20 sets of the positioning information to the tracking server, and the remaining 30 sets of the positioning information is reserved in the positioning database.

For illustration purposes, an example is described below in continuation of the contents of the positioning database in FIG. 4C. That is, assume that the transceiver 33 successfully uploads all of the 50 sets of positioning information generated by the positioning unit 32 to the tracking server.

FIG. 5A shows a schematic diagram of a portable device located in the area B according to FIG. 3. In FIG. 5A, the portable device 3 is similarly signally connected to the tracking server 55 via a wireless communication network 63.

Assume that at this point when the portable device 3 is located in the area B, the portable device 3 is incapable of establishing a signal connection with the positioning system. For example, the portable device 3 may be brought to a basement where the positioning unit 32 is incapable of receiving auxiliary coordinate information sent by satellites such that the positioning information cannot be generated.

Assume that the portable device 3 receives no positioning information for a period of time (e.g., one minute) after activating the positioning function, the positioning unit 32 stops positioning.

That is, in the event that the portable device 3 of the embodiment fails in obtaining the positioning information after performing the positioning function for a period of time, the portable device 3 deactivates the positioning unit 32 and ends the current round of positioning process.

FIG. 5B shows a schematic diagram of the contents of the database when the portable device is in the condition in FIG. 5A.

Since the portable device 3 is incapable of connecting to any positioning system in the area B, the positioning unit 32 does not generate any positioning information. Therefore, the positioning database does not store any updated positioning information. Consequently, the contents of the positioning database are kept the same as the contents of the positioning database in FIG. 4C.

FIG. 6A shows a schematic diagram of a portable device located in the area C according to FIG. 3.

In FIG. 6A, it is assumed that no wireless communication network is available in the area C. Thus, the portable device 3 is incapable of establishing a connection with the tracking server when the portable device 3 is located in the area C.

Nonetheless, the portable device 3 can be activated upon an activation condition of activating the positioning process at an interval of one hour. Further, the previously obtained tracking parameter is also set to activate tracking. Therefore, the positioning unit 32 still activates the positioning process at 10:00 a.m.

Similarly, the portable device 3 may also be moved around within the area C. At this point, the displacement detector 36 transmits a determination result indicating that the portable device 3 is in a moving state to the positioning unit 32. Accordingly, the positioning unit 32 generates 50 consecutive sets of positioning information through GPS satellites 77.

Assume that the portable device 3 moves from a location C1 to a location C50 in a period of 250 seconds starting from 10:00 a.m. At this point, position changes of the portable device 3 during the 250-second period are recorded in the storage unit 34.

It should be noted that, after 250 seconds, although the portable device 3 may still continue moving after the 50 sets of positioning information are generated, the positioning unit 32 is deactivated for saving electric power provided by the battery 35.

FIG. 6B shows a schematic diagram of the contents of the positioning database when the portable device is in the condition in FIG. 6A.

Since the portable device 3 is incapable of establishing a connection with the tracking server 55 in the area C, the contents of the positioning database cannot be uploaded. Thus, the storage unit 34 preserves the 50 sets of positioning information during the process of relocating from the location C1 to the location C50.

FIG. 7A shows a schematic diagram of a portable device located in the area according to FIG. 3.

In FIG. 7A, it is assumed that the portable device moves from the area C to the area D at 10:30 a.m., and is capable of signally connecting to the tracking server 55 via a wireless communication network 83 at this point.

When the connection status between the portable device 3 and the tracking server 55 changes from a disconnected status to a connected status, it means that another situation of the activation condition is satisfied, and so the positioning method of the present invention is again activated.

Assume that the portable device 3 obtains positioning information via a WiFi access point 88 of a WiFi positioning system after being relocated to the area D.

In addition, the portable device 3 no longer moves after being relocated to the area D. Thus, the displacement detector 36 transmits a determination result indicating that the portable device 3 is in a still state to the positioning unit 32.

When the portable device 3 is still, it means that the positioning unit 32 is not required to repetitively generate positioning information. Therefore, the positioning unit 32 generates only one set of positioning information D1 through the positioning system. Similarly, the positioning information D1 generated at this point is stored in the positioning database.

FIG. 7B shows a schematic diagram of the contents of the positioning database when the portable device is in the condition in FIG. 7A.

In continuation of the above descriptions, the positioning unit 32 generates merely one set of positioning information D1 as the portable device 3 does not move within the area D.

With the positioning information C1 to C50 obtained while the portable device 3 was located in the area C, the positioning database at this point contains 51 sets of positioning information.

Assume that the transceiver 33 successfully uploads the contents of the positioning database to the tracking server. The controller 31 then controls the storage unit 34 to delete the contents of the positioning database.

It is to be noted that, although the contents of the positioning information are not listed in detail, data columns included by the positioning information may be diversified, and may also be defined according to purposes provided by the portable device 3.

For example, the positioning information may include data columns such as a longitude data column, a latitude data column, an altitude data column, a speed data column, a precision data column, a time data column, a position provider data column (e.g., generating the positioning information through a GPS positioning system or a WiFi system). To adapt to different levels of details, the number of the data columns included by the positioning information may be increased or decreased.

Further, it should be noted that, a GPS and a WiFi positioning system are taken as an example of the foregoing positioning system rather than a limitation to applications of the present invention.

Concluded from the descriptions associated with the positioning process in FIGS. 4 to 7, the portable device 3 of the present invention features the characteristics below.

First of all, the portable device 3 of the embodiment is capable of automatically confirming a corresponding tracking parameter at the tracking server. If the tracking parameter is set to a status for continuous tracking, the portable device 3 periodically generates corresponding positioning information whenever activation condition is satisfied. Thus, even when a connection is not successfully satisfied with the tracking server 55, operations of the positioning process for the portable device 3 remain unaffected.

Secondly, the positioning process may be activated for the portable device 3 of the present invention in response to an arriving predetermined period (e.g., on the hour in FIGS. 4A, 5A and 6A), or when the connection between portable device 3 and the tracking server 55 changes from a disconnected status to a connected status (e.g. FIG. 7A).

Thirdly, the positioning unit 32 of the present invention is dynamically activated and deactivated to more effectively utilize the limited electric power of the portable device 3.

Even when the positioning unit 32 is incapable of generating the positioning information as shown in FIG. 5A, the positioning unit 32 is deactivated after a period of time. Hence, the positioning unit 32 of the present invention does not persistently consume the electric power of the battery 35.

Further, the positioning unit 32 does not continuously generate the positioning information even when the positioning unit 32 is capable of doing so.

When a connection is established between the positioning unit 32 and the positioning system, the positioning unit 32 further selectively generates multiple sets of positioning information (e.g., FIGS. 4A and 6A) or only one set of positioning information (e.g., FIG. 7A) according to a moving state of the portable device 3. After generating the corresponding number of sets of positioning information, the positioning unit 32 is deactivated.

Fourthly, the portable device 3 of the present invention first stores the positioning information to the storage unit 34, and only deletes the positioning information after successfully uploading the positioning information to the tracking server 55. Therefore, with the approach of the present invention, the concern of a tracking failure of the location of the portable device 3 due to an information loss can be eliminated.

In practice, the portable device 3 of the embodiment is equipped with specific tracking service software. The tracking service software executes the positioning method of the present invention as a background software. Once the portable device 3 is installed with the tracking service software, the tracking service software is automatically executed as the background each time the portable device 3 is powered on.

The tracking service software is chiefly executed by the controller 31. In an embodiment of the present invention, the tracking service software is divided into two parts—a locating procedure and an updating procedure.

The locating procedure is mainly in charge of managing the positioning unit 32 and the storage unit 34. For example, the locating procedure manages the activation and deactivation of the positioning unit 32, and stores the positioning information to the positioning database after the positioning unit 32 generates the positioning information. Further, the locating procedure also provides the determination result of the displacement detector 36 to the positioning unit 32 to serve as a basis for determining the number of positioning information to be obtained.

The updating procedure is mainly in charge of managing the connection status between the transceiver 33 and the tracking server. For example, the updating procedure uploads the positioning information to the tracking server in response to the quality of the connection status, and deletes the contents stored in the storage unit 34 after uploading the positioning information.

It should be noted that the details of implementing the tracking service software are not limited to the approaches above, and operation details and elements controlled by the locating procedure and the updating procedure may also be modified based on actual requirements. Various modifications to the positioning method of the present invention can be easily made by a person having ordinary skill in the art, and shall be omitted herein.

Tracking service software for implementing a positioning method according to one embodiment of the present invention is described below. The process of the locating procedure is illustrated with reference to FIG. 8, and the process of the updating procedure is illustrated with reference to FIG. 10.

Figure 8:
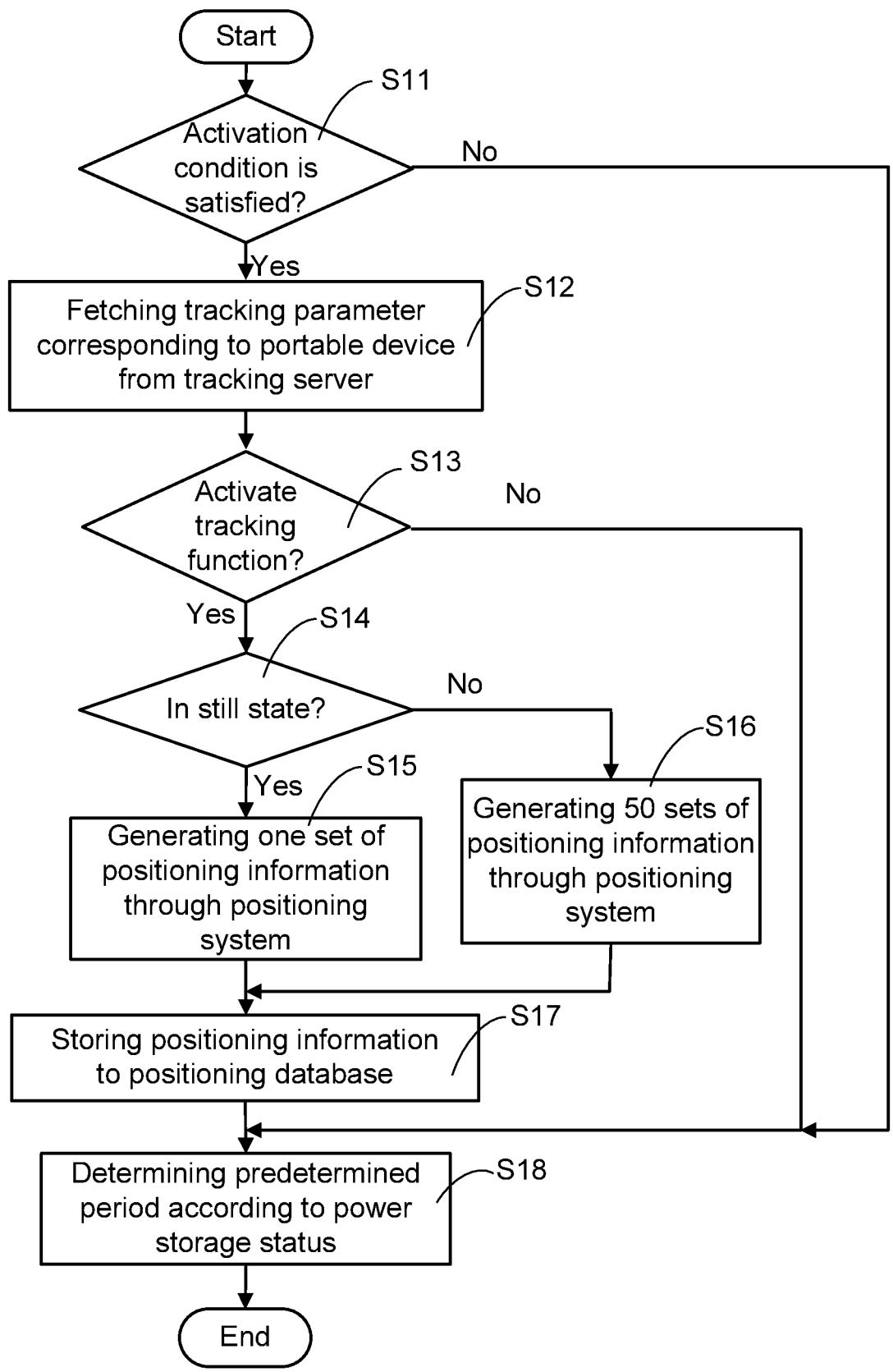
FIG. 8 is a flowchart of a locating procedure implemented by tracking service software according to an embodiment of the present invention.

FIG. 8 shows a flowchart of a process of a locating procedure implemented by tracking service software according to an embodiment of the present invention. The locating procedure according to an embodiment of the present invention includes the following steps.

In step S11, it is determined whether an activation condition is satisfied. The locating procedure ends when the activation condition is not satisfied. Or else, in step S12, a tracking parameter corresponding to a portable device is fetched from a tracking server.

In step S13, contents of the tracking parameter are determined, and different processing steps are performed according to the contents of the tracking parameter.

When the tracking parameter represents a first situation of deactivating the tracking function, it means that the tracking server need not learn about a location of the portable device, and so the locating procedure ends. When the tracking parameter represents a second situation of activating the tracking function, the subsequent process is performed.

In step S14, a positioning unit generates positioning information through a positioning system. Further, a displacement detector may determine whether the portable device is in a still state or a moving state, and accordingly determines the number of sets of positioning information to be generated.

In step S15, when the displacement detector determines that the portable device is in a still state, the positioning unit generates a set of positioning information through the positioning system. In step S16, when the displacement detector determines that the portable device is in a moving state, the positioning unit generates multiple sets of positioning information (e.g., 50 sets of positioning information) through the positioning system.

In step S17, a controller stores the positioning information generated by the positioning unit to a positioning database.

In continuation, each time the activation condition is satisfied, the foregoing locating procedure is repeated. For example, when the activation condition is again satisfied, a new set or 50 new sets of positioning information is generated through the positioning system, and the newly generated positioning information is stored to the positioning database.

Considering the limited electric power stored in a battery, undesirable effects may be resulted if the locating procedure is frequently performed.

In step S18, an adjustment method of a predetermined period may be determined by selectively according to a power storage status of the battery. Details of step S18 shall be described in detail with reference to FIG. 9.

For example, when the power storage status is higher than 50% (higher than a first remaining power capacity), the portable device may activate the locating procedure at an interval of one hour (a first time length). When the power storage status is between 25% and 50% (between a second remaining power capacity and the first remaining power capacity), the portable device may activate the locating procedure at an interval of six hours (a second time length). Alternatively, when the power storage status is lower than 25%, the portable device may activate the locating procedure at an interval of one day.

Figure 9:
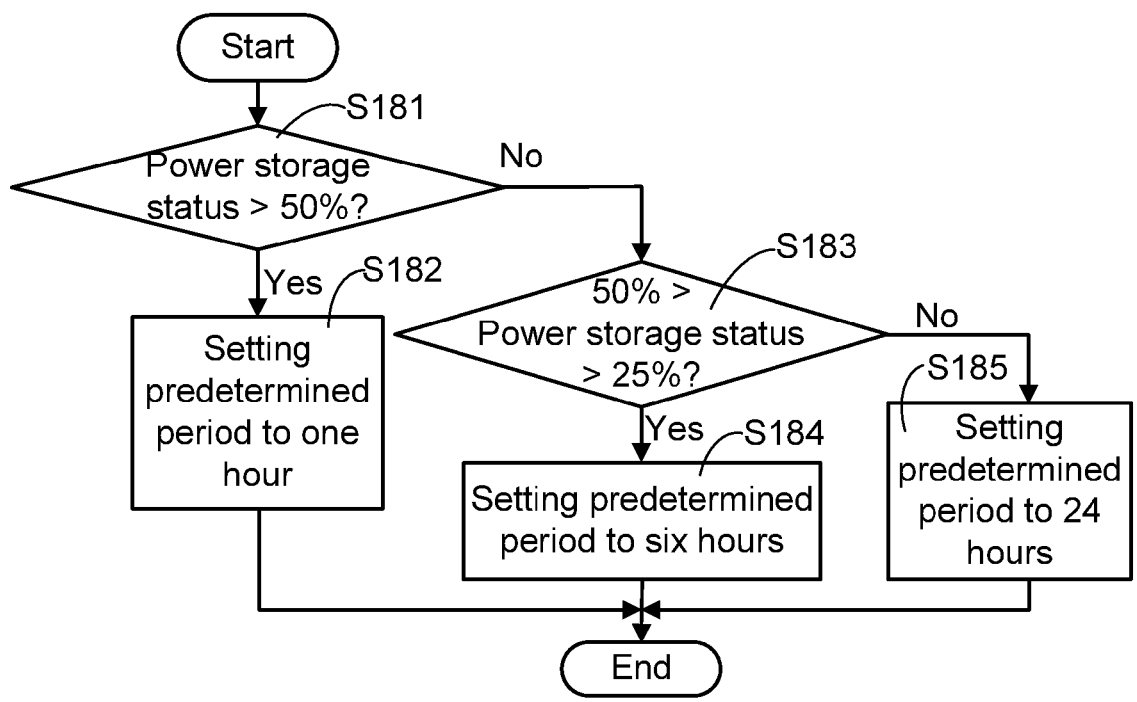
FIG. 9 is a flowchart of determining a predetermined period according to a power storage status in a locating procedure of tracking service software according to one embodiment of the present invention; and, FIG. 10 is a flowchart of an updating procedure implemented by tracking service software according to an embodiment of the present invention.

FIG. 9 shows a flowchart of determining a predetermined period according to a power storage status in a locating procedure of tracking service software according to one embodiment of the present invention. Step S18 in FIG. 8 is further described in detail according to the previously defined configuration relations between the power storage status and the predetermined period.

In step S181, it is determined whether the remaining power capacity of the battery is greater than 50%. If so, the predetermined period is set to an hour in step S182, or else it is determined whether the remaining power capacity of the battery is between 25% and 50% in step S183.

Step S184 is performed to set the predetermined period to six hours when the remaining power capacity of the battery is between 25% and 50%, or else step S185 is performed to set the predetermined period to 24 hours.

According to a principle of the present invention, when the remaining power capacity of the battery is high, the locating procedure is activated more frequently. In such case, the predetermined period is shorter. With the remaining power capacity of the battery drops, the length of the predetermined period becomes longer. That is, when the remaining power capacity of the battery is low, the locating procedure is activated at a longer interval.

It should be noted that the corresponding relations between the power storage status and the predetermined period are not limited to the examples described above. In an alternative embodiment, for example, the predetermined period is set to 12 hours when the remaining power capacity of the battery is lower than 20%, six hours when the remaining power capacity of the battery is between 20% and 50%, two hours when the remaining power capacity of the battery is between 50% and 80%, and 30 minutes when the remaining power capacity of the battery is higher than 80%.

Figure 10:
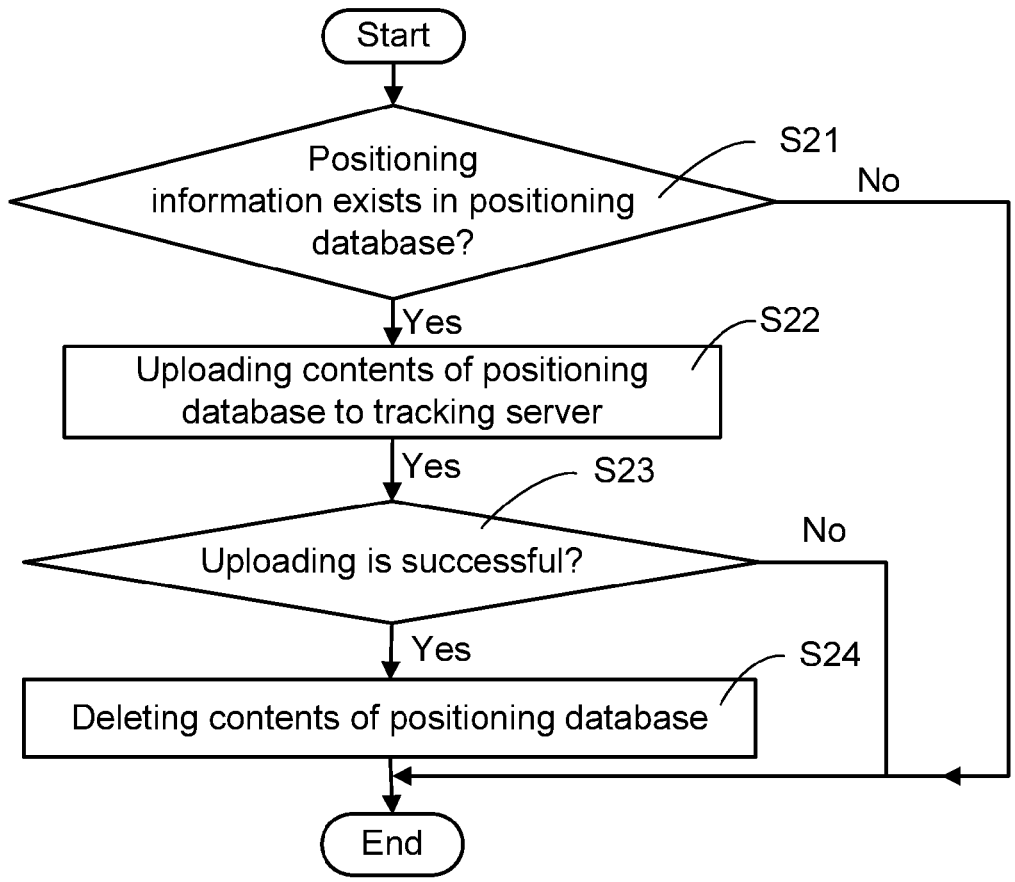

FIG. 10 shows a flowchart of an updating procedure implemented by tracking service software according to an embodiment of the present invention.

In step S21, it is determined whether positioning information exists in a positioning database. If not, it means that the updating procedure is not required. If so, contents of the positioning database are uploaded to a tracking server in step S22.

However, due to a poor connection status between the portable device and the tracking server, the contents of the positioning database may not be successfully uploaded to the tracking server.

In step S23, the updating procedure determines whether the contents of the positioning database are successfully uploaded to the tracking server. If not, it means that the connection status is quite unsatisfactory, and the updating procedure ends. In contrast, in step S24, when the contents of the positioning database are successfully uploaded to the tracking server, the contents of the positioning database can be deleted.

Further, the connection status between the portable device and the tracking server may also affect whether to perform the updating procedure. Therefore, the portable device may first determine a state of the connection status between portable device and the tracking server. When the connection status is satisfactory, the contents of the positioning database are uploaded to the tracking server through the updating procedure. Otherwise, the updating procedure is terminated when the connection status is unsatisfactory.

In addition to the foregoing embodiments, the tracking server may also simultaneously establish a signal connection with multiple portable devices through the wireless communication network.

For example, the tracking server may at the same time monitors locations of a first portable device, a second portable device and a third portable device. The tracking server is signally connected to the first portable device, the second portable device and the third portable device via a wireless communication network.

In an actual application, assuming that each of three children in a household owns one of the three portable devices, parents may acquire locations of the portable devices carried by the children by activating the tracking parameters in the tracking server. That is, a user is allowed to manage multiple portable devices and set corresponding tracking parameters via a server.

For example, the tracking function of the first portable device may be set to activate, whereas the other portable devices are set to deactivate the tracking function. A reason for activating the tracking function may be when the portable device is lost, or when parents worry about the whereabouts of a child.

The first, second and third portable devices may respectively employ the positioning method of the present invention. Such application is within the scope of the present invention, and a person having ordinary skill in the art may make appropriate modifications to the embodiments.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A positioning method, applied to a portable device signally connected to a tracking server, comprising steps of:
    fetching a tracking parameter corresponding to the portable device when an activation condition is satisfied;
    generating at least one set of positioning information through a positioning system;
    storing the at least one set of positioning information to a positioning database; and
    selectively uploading contents of the positioning database to the tracking server according to the tracking parameter.

2. The positioning method according to claim 1, wherein the activation condition is a predetermined period passed, or when the signal connection with the tracking server changes from a disconnected status to a connected status.

3. The positioning method according to claim 2, wherein the predetermined period is determined by a power storage status of the portable device.

4. The positioning method according to claim 3, wherein
    the predetermined period has a first time length when the power storage status is higher than a first remaining power capacity; and
    the predetermined period has a second time length when the power storage status is between a second remaining power capacity and the first remaining power capacity,
    wherein the first remaining power capacity is greater than the second remaining power capacity, and the first time length is shorter than the second time length.

5. The positioning method according to claim 1, wherein the positioning system is a Global Positioning System (GPS) or a WiFi positioning system.

6. The positioning method according to claim 1, wherein the step of generating the at least one set of positioning information through the positioning system comprises steps of:
    determining whether the portable device is in a still state or a moving state;
    generating a set of positioning information through the positioning system when it is determined that the portable device is in the still state; and
    generating a plurality of sets of positioning information through the positioning system when it is determined that the portable device is in the moving state.

7. The positioning method according to claim 6, wherein the portable device determines whether the portable device is in the still state or the moving state via a gravity sensor (G-sensor).

8. The positioning method according to claim 1, wherein the at least one set of positioning information comprises a longitude data column, a latitude data column, an altitude data column, a speed data column, a precision data column, a time data column, or a location provider data column.

9. The positioning method according to claim 1, wherein the step of selectively uploading the contents of the positioning database to the tracking server according to the tracking parameter comprises:
    when the tracking parameter represents activating a tracking function, uploading the contents of the positioning database to the tracking server in response to a connection status with the tracking server; and
    deleting the contents of the positioning database after uploading.

10. The positioning method according to claim 9, wherein the step of uploading the contents of the positioning database to the tracking server in response to a connection status with the tracking server when the tracking parameter represents activating the tracking function comprises:
    determining the connection status with the tracking server; and
    uploading the contents of the positioning database to the tracking server when the connection status is satisfactory.

11. A portable device, signally connected to a tracking server, comprising:
    a transceiver, signally connected to the tracking server, for fetching a tracking parameter when an activation condition is satisfied, wherein the tracking parameter is corresponding to the portable device;
    a positioning unit, for generating at least one set of positioning information through a positioning system;
    a storage unit, electrically connected to the transceiver and the positioning unit, for providing a positioning database; and
    a controller, electrically connected to the transceiver, the positioning unit and the storage unit, for storing the at least one set of positioning information to the positioning database, and selectively uploading contents of the positioning database to the tracking server according to the tracking parameter.

12. The portable device according to claim 11, wherein the activation condition is satisfied
    when a predetermined period passed, or
    when the signal connection with the tracking server changes from a disconnected status to a connected status.

13. The portable device according to claim 12, further comprising:
    a battery, electrically connected to the controller;

wherein, the controller determines a length of the predetermined period according to a power storage status of the battery.

14. The portable device according to claim 13, wherein
the predetermined period has a first time length when the power storage status is higher than a first remaining power capacity; and
the predetermined period has a second time length when the power storage status is between a second remaining power capacity and the first remaining power capacity,
wherein the first remaining power capacity is greater than the second remaining power capacity, and the first time length is shorter than the second time length.

15. The portable device according to claim 11, wherein the positioning system is a GPS or a WiFi positioning system.

16. The portable device according to claim 11, further comprising:
a displacement detector, electrically connected to the positioning unit, for determining whether the portable device is in a still state or a moving state;
wherein, the positioning unit generates a set of positioning information through the positioning system when the displacement detector determines that the portable device is in the still state, and generates a plurality of sets of positioning information trough the positioning system when the positioning unit determines that the portable device is in the moving state.

17. The portable device according to claim 16, wherein the portable device determines whether the portable device is in the still state or the moving state via a G-sensor.

18. The portable device according to claim 11, wherein the at least one set of positioning information comprises a longitude data column, a latitude data column, an altitude data column, a speed data column, a precision data column, a time data column, or a location provider data column.

19. The portable device according to claim 11, wherein the controller controls the transceiver to upload contents of the positioning database to the tracking server in response to a connection status with the tracking server when the tracking parameter represents activating a tracking function, and controls the storage unit to delete the contents of the positioning database after the contents of the positioning database are uploaded to the tracking server.

20. The portable device according to claim 19, wherein the controller determines the connection status between the transceiver and the tracking server, and controls the transceiver to upload the contents of the positioning database to the tracking server when the connection status is satisfactory.

* * * * *